United States Patent [19]

Carter et al.

[11] Patent Number: 5,607,648
[45] Date of Patent: Mar. 4, 1997

[54] ROTARY KILNS

[75] Inventors: Robert Carter; John T. Semeraz, both of Preston, United Kingdom

[73] Assignee: British Nuclear Fuels plc, Warrington, United Kingdom

[21] Appl. No.: 367,303

[22] PCT Filed: May 4, 1994

[86] PCT No.: PCT/GB94/00953

§ 371 Date: Jan. 20, 1995

§ 102(e) Date: Jan. 20, 1995

[87] PCT Pub. No.: WO94/26405

PCT Pub. Date: Nov. 24, 1994

[30] Foreign Application Priority Data

May 8, 1993 [GB] United Kingdom .................. 9309505

[51] Int. Cl.[6] ........................................... B01J 4/00
[52] U.S. Cl. ......................... 422/137; 422/159; 422/229; 422/239; 423/613
[58] Field of Search ..................... 422/137, 159, 422/210, 229, 239; 366/156; 423/253, 261, 19, 612, 613; 252/636; 435/290.2, 295.3, 297.1

[56] References Cited

U.S. PATENT DOCUMENTS

| 3,057,702 | 10/1962 | Pierce et al. | 422/137 |
| 3,111,394 | 11/1963 | Weber et al. | 422/159 |
| 3,518,062 | 6/1970 | Delange et al. | 422/159 |
| 3,698,697 | 10/1972 | Gillies et al. | 423/261 |
| 4,112,055 | 9/1978 | Artuad | 422/261 |
| 4,397,824 | 8/1983 | Butler et al. | 423/261 |
| 4,574,078 | 3/1986 | Cortesi et al. | 423/592 |

Primary Examiner—Robert J. Warden
Assistant Examiner—Theresa T. Snider
Attorney, Agent, or Firm—Nixon & Vanderhye P.C.

[57] ABSTRACT

A rotary kiln, particularly for producing uranium dioxide from uranium hexafluoride, has an inlet arrangement and a heated rotatable barrel. Uranium hexafluoride and steam react together in the inlet arrangement to form uranyl fluoride which is fed into the barrel by the aid of a rotating scroll feed device. In the barrel, the uranyl fluoride reacts with a counterflow stream of steam and hydrogen to produce the uranium dioxide. A porous metal or ceramic filter closely surrounds the scroll feed device to remove particles from kiln-produced gases. The filter is maintained in a clean condition by the scraping action of a number of helical blades forming part of the scroll feed device. The uranium dioxide powder produced by the kiln may be processed to form nuclear fuel pellets.

12 Claims, 3 Drawing Sheets

ROTARY KILNS

BACKGROUND OF THE INVENTION

1. Field of the Invention

This invention relates to rotary kilns in which gaseous reactions are carried out to form a solid product. The invention has particular relevance, although not exclusively, to rotary kilns used to manufacture uranium dioxide powder suitable for subsequent conversion to nuclear fuel pellets.

2. Discussion of Prior Art

In one known type of rotary kiln uranium hexafluoride vapour is fed with steam into an inlet end of the kiln. Reaction between the uranium hexafluoride and steam produces a solid intermediate product in the form of uranyl fluoride which passes into a heated rotating barrel by the aid of a scroll feed device. As the uranyl fluoride progresses along the barrel it reacts with a counterflowing stream of hydrogen and steam. This reduces the uranyl fluoride to a uranium dioxide powder which is discharged from the outlet end of the kiln.

Off gases produced by reactions in the kiln flow towards the inlet end and pass into a filter hopper arranged above the scroll feed device. Mounted on the top of the hopper are several filter assemblies which are used to extract solid particles from the reaction gases.

In use, a major portion of the uranyl fluoride particles circulate within the inlet region for a period of time during which particle can grow and agglomorate in a dendritic manner. Eventually, the particles become disentrained from the reaction gases and fall into the scroll feed device which transfers them into the kiln barrel.

SUMMARY OF THE INVENTION

We have found that the filter hopper can be reduced in height by use of the construction hereinafter described without adverse effect on the product quality and reaction in the inlet region. It is an object of this invention to provide a rotary kiln having an improved inlet region.

According to one aspect of the invention there is provided a rotary kiln for producing a solid material from gaseous reactants, said kiln having an inlet arrangement, an outlet arrangement and a rotatable barrel extending between the inlet and outlet arrangements, means for introducing gaseous reactants into said inlet arrangement, said reactants reacting together to form a solid product, wherein the inlet arrangement includes a rotatable scroll feed device for feeding the solid product into the barrel, and a filter for separating particles from gases produced in the kiln, the filter being arranged so as to at least partially encircle the scroll feed device and located adjacent thereto.

Preferably, the scroll feed device comprises a number of helical blades which effect a cleaning action on the filter.

The filter may comprise a porous metal or ceramic body in the form of an annular sleeve which surrounds the filter. Gases leaving the kiln through the filter may be extracted from a chamber externally surrounding the filter through pipes communicating with the chamber.

In a preferred embodiment the solid material produced by the kiln is uranium dioxide powder.

The gaseous reactants introduced into said inlet arrangement are preferably uranium hexafluoride and steam which in use react together to form a solid uranyl fluoride intermediate product, wherein means are provided for introducing steam and hydrogen at said outlet arrangement so as to flow along the barrel towards said inlet arrangement, the steam and hydrogen reacting with the uranyl fluoride product to produce said uranium dioxide powder.

The uranium hexafluoride and steam reactants may be introduced into the inlet arrangement through a nozzle having an inner tube surrounded by an annular passage, one reactant being supplied through the inner tube and the other reactant being conveyed through the annular passage. Uranium hexafluoride is preferably supplied through the inner tube while steam is conveyed through the annular passage.

BRIEF DESCRIPTION OF THE DRAWINGS

Embodiments of the present invention will now be described, by way of example only, with reference to the accompanying drawings, in which.

DETAILED DISCUSSION OF PREFERRED EMBODIMENTS

Figure 1:
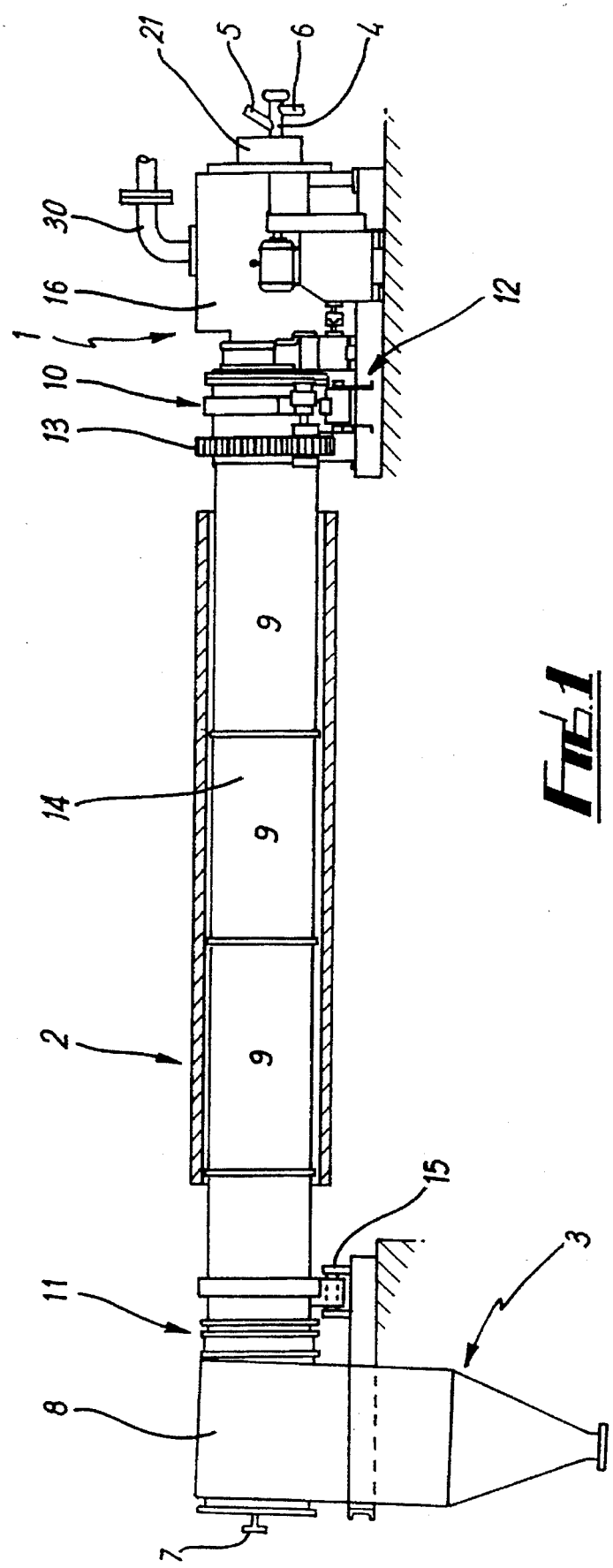
FIG. 1 is a diagrammatic view of a rotary kiln assembly.

Referring to FIG. 1, a rotary kiln assembly, suitable for the production of uranium dioxide powder, comprises an inlet arrangement 1, a rotary kiln section 2, and an outlet arrangement 3. The inlet arrangement 1 includes a reactant gas inlet nozzle 4 to which an inlet pipe 5 for steam and an inlet pipe 6 for vaporised uranium hexafluoride are connected. The outlet arrangement 3 includes an inlet jet 7 for steam, a further inlet jet (not shown) for hydrogen and a hopper 8 through which uranium dioxide powder is discharged. Included in the rotary kiln section 2 are a number of separately temperature-controllable sections 9, so that a desired temperature profile can be obtained in the kiln. A rotating seal assembly 10 is disposed between the inlet arrangement 1 and the rotary kiln section 2 and a rotating seal assembly 11 is provided between the rotary kiln section 2 and the outlet arrangement 3. Positioned at the inlet end of the kiln assembly is a drive assembly 12 which, in use, turns a gear wheel 13 so as to rotate a cylindrical barrel 14 in the rotary kiln section 2. The barrel 14 is rotatably mounted on a support 15 arranged at the outlet end of the kiln assembly.

Although the kiln assembly is illustrated in a horizontal position, in practice it will be inclined downwardly from the inlet arrangement to the outlet arrangement so as to facilitate the flow of material towards the outlet end.

Figure 2:
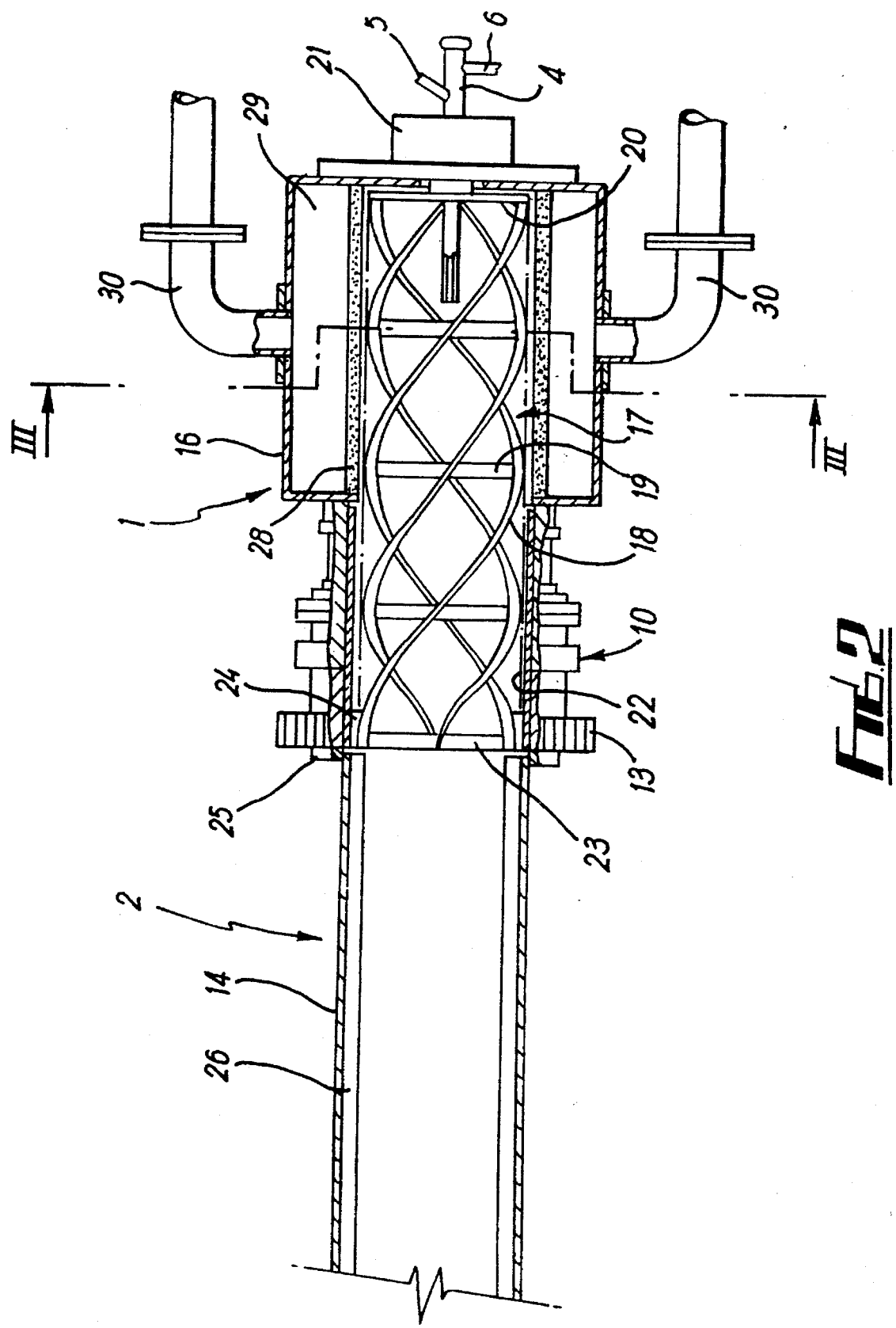
FIG. 2 is a diagrammatic sectional view of an inlet arrangement for the rotary kiln.

As seen in FIG. 2, the inlet arrangement 1 includes a casing 16 which houses a feed device, preferably a scroll feed device 17, or a similar type of screw conveyor. Typically, the scroll feed device comprises four helical blades 18 welded to supporting rings 19. At the rear end of the scroll feed device 17 the blades 18 are welded to an annular end plate 20 by means of which the device is supported by a bearing and seal assembly 21 mounted on a rear end wall of the casing 16.

At its forward end the scroll feed device 17 extends through the inner sleeve 22 of the seal assembly 10. A supporting ring 23 is welded to the forward ends of the blades 18. Short helical scroll blades 24 are welded to the inside of the inner sleeve 22 which is coupled to the gear wheel 13. A coupling plate 25 couples the gear wheel 13 to the barrel 14. Extending along the inner surface of the barrel 14 are straight lifting flights 26, the function of which is described later.

Encircling the scroll feed device 17 and housed within the casing 16 is an annular filter 28, the inner surface of which defines a small gap with the outer edges of the blades 18. The filter 28 completely surrounds the scroll feed device and preferably comprises a porous metal formed by a sintering process. Although the filter 28 preferably completely encircles the scroll feed device, it will be appreciated that a satisfactory arrangement may be obtained where the filter only partially surrounds the device. The diameters of the scroll feed device and the filter can be selected to allow the necessary recirculation of the uranyl fluoride particles. A chamber 29 is formed within the casing 16 for receiving gases that have passed through the filter 28, these gases being removed from the chamber 29 by two gas discharge pipes 30.

Figure 3:
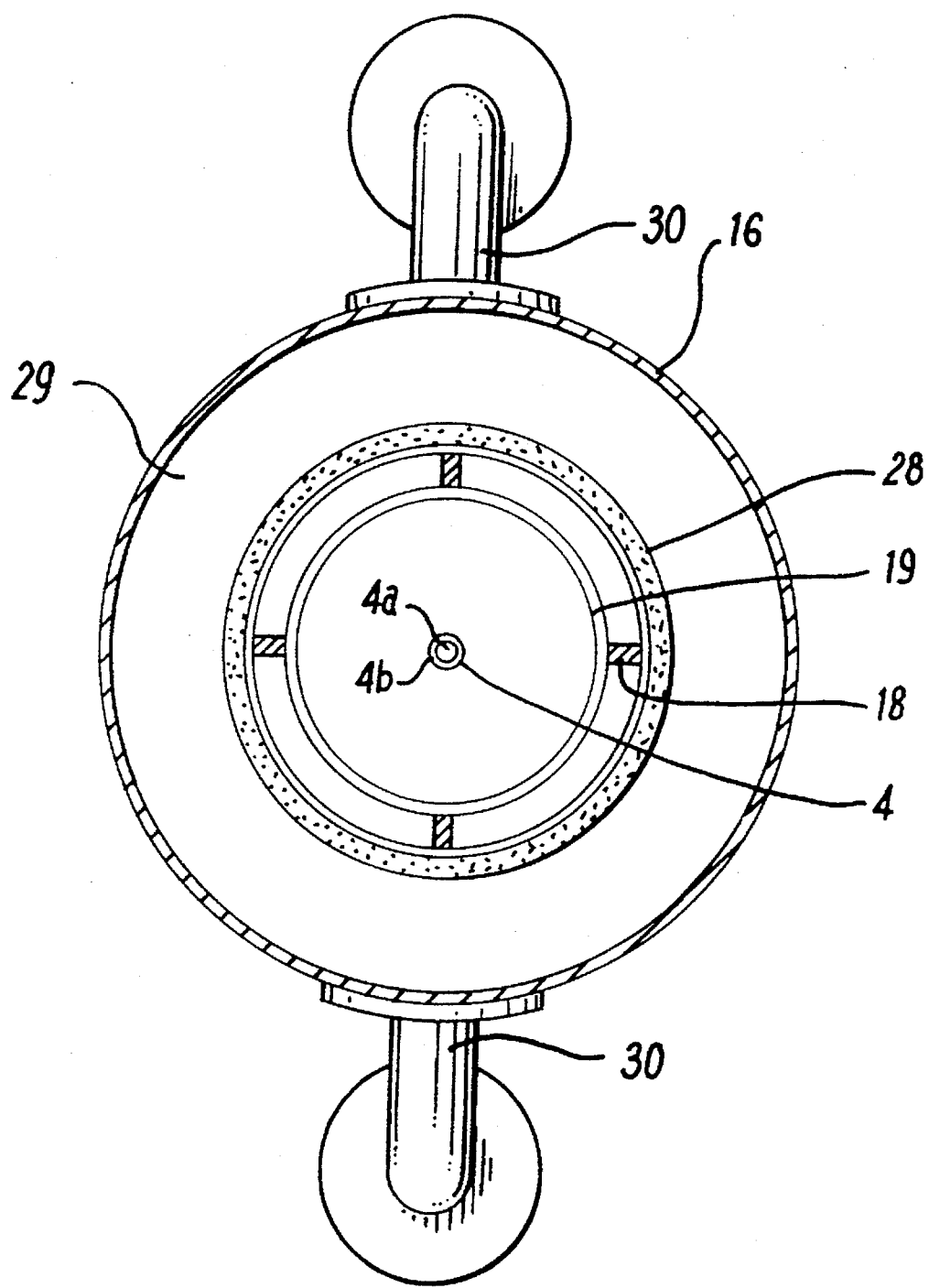
FIG. 3 is a cross-sectional view on the line III—III.

During operation of the kiln for carrying out the production of uranium dioxide powder, uranium hexafluoride vapour is supplied through the inlet pipe 6 and steam is fed through inlet pipe 5 into the nozzle 4 as shown in FIG. 3. Preferably, the nozzle has an inner tube 4a surrounded by a coaxial outer annular passage 4b. Uranium hexafluoride is conveyed through the inner tube 4a and steam passes through the annular passage 4b. The uranium hexafluoride and steam issuing from the nozzle 4 within the scroll feed device 17 react together in the form of a plume which is directed towards the inlet end of the barrel 14. Resulting from the reaction is a solid intermediate product in the form of uranyl fluoride which passes into the rotating barrel 14 aided by the action of the rotating scroll feed device 17. Rotation of the scroll feed device 17, the inner sleeve 22 and the barrel 14 is derived from the gear wheel 13 to which a drive is transmitted from the drive assembly 12.

In passing down the barrel 14 the uranyl fluoride reacts with a counterflowing gaseous mixture of steam and hydrogen which is introduced at the outlet end of the kiln assembly. The lifting and tumbling action effected on the uranyl fluoride product by the lifting flights 26 ensures efficient contact of the solid and gaseous materials and efficient conversion of the uranyl fluoride to uranium dioxide powder. The quality of the uranium dioxide powder is influenced by controlling the three temperature zones 9 to the appropriate profile in the range of 500–800 degrees centigrade. The uranium dioxide powder is discharged through the hopper 8 and may be subsequently processed into nuclear fuel pellets.

Off gases, consisting of excess hydrogen, nitrogen, hydrogen fluoride and steam, resulting from the process flow towards the inlet arrangement 1 and are extracted through the filter 28 to remove solid particles. The filtered gases pass into the chamber 29 from which they are discharged through the pipes 30 to a plant for further treatment.

In addition to forwarding the uranyl fluoride to the barrel 14, the blades 18 of the scroll feed device 17 serve to scrape excess material from the inner surface of the filter 28. Thus the filter is maintained in a clean condition, so extending the service life and reducing maintenance.

It will be appreciated that the filter can be made of any suitable material, for example, porous ceramic, that is capable of operating within a high temperature environment. Preferably, the filter is designed for easy removal so as to facilitate the replacement of a used filter by a fresh one.

Although the invention has particular relevance to rotary kilns used in the production of uranium dioxide powder, it can be incorporated in similar aerosol reactors for producing other solid materials. One example is the production of titanium dioxide powder in which the reactants supplied to the gas inlet nozzle 4 are titanium tetrachloride vapour and steam.

We claim:

1. A rotary kiln for producing a solid material from gaseous reactants comprises:

an inlet arrangement, an outlet arrangement, a rotatable barrel extending between the inlet and outlet arrangements, means for introducing gaseous reactants into said inlet arrangement, said reactants reacting together to form a solid product, wherein the inlet arrangement includes:

a rotatable scroll feed device for feeding the solid product into the barrel, and a filter for separating particles from gases produced in the kiln, the filter arranged so as to at least partially encircle the scroll feed device and located adjacent thereto, rotation of said scroll feed device effecting a cleaning action on said filter.

2. A rotary kiln according to claim 1, wherein the scroll feed device comprises a number of helical blades.

3. A rotary kiln according to claim 1, wherein the filter comprises a porous metal body.

4. A rotary kiln according claim 1, wherein the filter comprises a porous ceramic body.

5. A rotary kiln according to claim 1, wherein the filter comprises an annular sleeve which surrounds the scroll feed device.

6. A rotary kiln according to claim 1, wherein the filter is housed within a casing which defines a chamber for receiving gases which have passed through the filter, and further comprising pipe means communicating with said chamber for removing said gases therefrom.

7. A rotary kiln according to claim 1, wherein the solid material produced by the kiln comprises a uranium dioxide powder.

8. A rotary kiln according to claim 7, wherein the gaseous reactants are uranium hexafluoride and steam which react together to form a solid uranyl fluoride intermediate product, and wherein means are provided for introducing steam and hydrogen at said outlet arrangement so as to flow along the barrel towards said inlet arrangement, the steam and hydrogen reacting with the uranyl fluoride to produce said uranium dioxide powder.

9. A rotary kiln according to claim 8, wherein the uranium hexafluoride and steam reactants are introduced into said inlet arrangement through nozzle means comprising an inner tube surrounded by an annular passage, wherein one of said reactants is supplied through the inner tube and the other of said reactants is conveyed through the annular passage.

10. A rotary kiln according to claim 9, wherein the uranium hexafluoride is supplied through the inner tube and the steam is conveyed through the annular passage.

11. A rotary kiln according claim 1 wherein the solid material produced by the kiln comprises a titanium dioxide powder.

12. A rotary kiln according to claim 11 wherein the gaseous reactants introduced into the inlet arrangement are titanium tetrachloride and steam.

* * * * *